United States Patent
Singh et al.

(10) Patent No.: US 12,493,864 B2
(45) Date of Patent: Dec. 9, 2025

(54) SYSTEMS AND METHODS FOR COMPLETING PAYMENT TRANSACTIONS INITIATED THROUGH A FIRST DEVICE USING A SECOND DEVICE

(71) Applicant: Adeia Guides Inc., San Jose, CA (US)

(72) Inventors: Gyanveer Singh, Bangalore (IN); Reda Harb, Bellevue, WA (US)

(73) Assignee: Adeia Guides Inc., San Jose, CA (US)

( * ) Notice: Subject to any disclaimer, the term of this patent is extended or adjusted under 35 U.S.C. 154(b) by 122 days.

(21) Appl. No.: 17/863,502

(22) Filed: Jul. 13, 2022

(65) Prior Publication Data
US 2024/0020677 A1     Jan. 18, 2024

(51) Int. Cl.
| | | |
|---|---|---|
| *G06Q 20/12* | (2012.01) | |
| *G06Q 20/40* | (2012.01) | |
| *G06F 3/16* | (2006.01) | |
| *G06Q 20/32* | (2012.01) | |
| *G06Q 20/34* | (2012.01) | |
| *G06Q 20/36* | (2012.01) | |

(52) U.S. Cl.
CPC ....... *G06Q 20/12* (2013.01); *G06Q 20/40145* (2013.01); *G06F 3/167* (2013.01); *G06Q 20/3224* (2013.01); *G06Q 20/353* (2013.01); *G06Q 20/3674* (2013.01)

(58) Field of Classification Search
None
See application file for complete search history.

(56) References Cited

U.S. PATENT DOCUMENTS

| | | | | |
|---|---|---|---|---|
| 8,089,943 | B2 * | 1/2012 | Lim | H04L 63/02 |
| | | | | 705/14.64 |
| 9,412,278 | B1 * | 8/2016 | Gong | G06F 21/6227 |
| 10,042,993 | B2 * | 8/2018 | Beigi | G06F 21/32 |
| 11,232,494 | B2 * | 1/2022 | Thye | H04L 47/822 |
| 11,282,523 | B2 * | 3/2022 | Gross | G10L 15/22 |

(Continued)

FOREIGN PATENT DOCUMENTS

| | | | | |
|---|---|---|---|---|
| AU | 2006335151 A1 * | 7/2007 | ......... | G06Q 30/0601 |
| CA | 3151297 A1 * | 9/2022 | ............. | G10L 15/08 |

(Continued)

OTHER PUBLICATIONS

Hayashi VT, Ruggiero WV. Hands-Free Authentication for Virtual Assistants with Trusted IoT Device and Machine Learning. Sensors (Basel). Feb. 9, 2022. https://www.ncbi.nlm.nih.gov/pmc/articles/PMC8874467/ (Year: 2022).*

(Continued)

*Primary Examiner* — El Mehdi Oussir
(74) *Attorney, Agent, or Firm* — HALEY GUILIANO LLP

(57) ABSTRACT

A payment transaction is initiated for a user, based on a voice command, on a public voice-activated device. A user device associated with the user is identified. A transaction identifier is generated and transmitted to the identified user device. Once the user has entered their banking or credit card information to use for payment, a payment token is received from the user device. The transaction is then completed using the payment token. The payment token may be generated from a local digital wallet on the user device, or from a server-based digital wallet.

20 Claims, 7 Drawing Sheets

(56) References Cited

U.S. PATENT DOCUMENTS

| | | | |
|---|---|---|---|
| 11,700,259 B2* | 7/2023 | Chauhan | G06F 21/45 |
| 11,915,216 B2* | 2/2024 | Grassadonia | G06Q 20/3278 |
| 12,131,325 B1* | 10/2024 | Lyle | G06Q 20/1085 |
| 2009/0198617 A1* | 8/2009 | Soghoian | G06Q 20/04 |
| | | | 705/65 |
| 2016/0012465 A1* | 1/2016 | Sharp | G06Q 20/321 |
| | | | 705/14.17 |
| 2016/0335253 A1* | 11/2016 | Berke | G06F 16/345 |
| 2017/0011406 A1* | 1/2017 | Tunnell | G06Q 20/308 |
| 2017/0270530 A1* | 9/2017 | Sheets | G10L 17/22 |
| 2018/0047394 A1* | 2/2018 | Tian | G10L 15/24 |
| 2018/0204111 A1* | 7/2018 | Zadeh | G06V 10/764 |
| 2019/0051304 A1* | 2/2019 | Tian | G10L 17/06 |
| 2019/0319606 A1 | 10/2019 | Ando et al. | |
| 2019/0392834 A1* | 12/2019 | Yi | G01S 5/20 |
| 2020/0059468 A1 | 2/2020 | Wolosewicz | |
| 2020/0168229 A1* | 5/2020 | Manchireddy | H04W 4/80 |
| 2020/0258072 A1* | 8/2020 | Unnerstall | G06Q 20/40145 |
| 2020/0302423 A1* | 9/2020 | Vijayaraghavan | G06Q 20/322 |
| 2021/0328800 A1 | 10/2021 | Lee et al. | |
| 2022/0121884 A1* | 4/2022 | Zadeh | G06N 3/006 |
| 2022/0139546 A1* | 5/2022 | Manjunath | H04L 9/3231 |
| | | | 705/2 |
| 2022/0172729 A1* | 6/2022 | Mohajer | G06F 3/167 |
| 2022/0245574 A1* | 8/2022 | Cella | G06Q 10/087 |
| 2022/0279063 A1* | 9/2022 | Coffman | G06F 3/0482 |
| 2022/0382844 A1* | 12/2022 | Keith, Jr. | A61B 5/7264 |
| 2023/0031145 A1* | 2/2023 | Narayanan | G06V 10/147 |
| 2023/0206236 A1* | 6/2023 | Pinnamaneni | G10L 17/22 |
| | | | 705/44 |
| 2023/0206329 A1* | 6/2023 | Cella | G06Q 20/0855 |
| 2023/0230067 A1* | 7/2023 | Upadhye | G06Q 20/4016 |
| | | | 705/65 |
| 2023/0281598 A1* | 9/2023 | Singh | G06Q 20/20 |
| | | | 705/44 |
| 2024/0022565 A1* | 1/2024 | Keith, Jr. | H04L 63/0861 |
| 2024/0118702 A1* | 4/2024 | Cella | G06Q 10/0635 |
| 2025/0165716 A1* | 5/2025 | Cristache | G06F 40/30 |

FOREIGN PATENT DOCUMENTS

| | | | | |
|---|---|---|---|---|
| CN | 103843024 A | * | 6/2014 | G02B 27/017 |
| CN | 110999228 A | * | 4/2020 | G06F 3/04842 |
| EP | 2325837 A2 | * | 5/2011 | G10L 15/22 |
| JP | 2023137650 A | * | 9/2023 | G06V 20/50 |
| JP | 7478304 B2 | * | 5/2024 | G06F 3/0488 |
| KR | 101328766 B1 | * | 11/2013 | G06V 30/262 |
| WO | WO-2020091248 A1 | * | 5/2020 | G06F 3/16 |
| WO | WO-2022055068 A1 | * | 3/2022 | G10L 15/22 |

OTHER PUBLICATIONS

A. Phipps, K. Ouazzane and V. Vassilev, "Enhancing Cyber Security Using Audio Techniques: A Public Key Infrastructure for Sound," 2020 IEEE 19th International Conference on Trust, Security and Privacy in Computing and Communications (TrustCom), https://ieeexplore.ieee.org/document/9342995?source=IQplus.*

Hayashi V, Ruggiero W. Non-Invasive Challenge Response Authentication for Voice Transactions with Smart Home Behavior. Sensors (Basel). (Year: 2020).*

Hayashi VT, Ruggiero WV. Hands-Free Authentication for Virtual Assistants with Trusted IoT Device and Machine Learning. Sensors (Basel). (Year: 2022).*

Subirana et al., The MIT Voice Name System, Massachusetts Institute of Technology and Harvard University. https://arxiv.org/pdf/2204.09657. (Year: 2022).*

M. Vacher, B. Lecouteux, J. S. Romero, M. Ajili, F. Portet and S. Rossato, "Speech and speaker recognition for home automation: Preliminary results," 2015 International Conference on Speech Technology and Human-Computer Dialogue (SpeD), https://ieeexplore.ieee.org/document/7343100?source=IQplus. (Year: 2015).*

* cited by examiner

SYSTEMS AND METHODS FOR COMPLETING PAYMENT TRANSACTIONS INITIATED THROUGH A FIRST DEVICE USING A SECOND DEVICE

BACKGROUND

This disclosure is directed to completion of payment transactions. In particular, techniques are disclosed for transferring payment transactions initiated on a public voice-activated device to a private user device for completion.

SUMMARY

Public voice-activated devices (e.g., smart assistant devices) are being used for conducting e-commerce transactions including voice-based payment. Users can configure their smart assistant devices to process voice payments. For enabling voice payments, a user must save their credit card details with a digital wallet that they may want to use. For example, to complete an e-commerce transaction using Amazon® Echo®, the device must be configured with the user's payment details. Normally, an Echo® device is linked to the user's Amazon Pay® account. The credit card information is stored in the cloud and is not transferred over the smart assistant client device. If there is only one person who is using the smart assistant client device (e.g., the user lives alone), then there is not much of a concern, but there may be issues when there are many people in the home including children, who may give commands to the smart assistant client device. The user may not want other members in the home to use the saved credit card/banking details for completing a transaction initiated on the smart assistant client device that is configured with their profile. This is one reason to not store banking details on such devices. Further, even a single user may want to use multiple modes of payment, for example, a different credit card than the one stored with the smart assistant cloud service, or their Apple Pay® or Google Wallet® account.

Some existing systems protect primary users from getting billed for unwanted transactions. For example, voice signature or facial recognition is being used by the smart assistants (as used herein, the term "smart assistant" refers to combined features of the smart assistant client device as well as the smart assistant cloud service) to authenticate the user. As the smart assistant device is tied to a specific user profile, only they can make the payment after successfully authenticating themselves. If anyone else tries to make the payment, the authentication will fail. Existing systems provide required security to the primary user but limit other users from availing themselves of the voice payment services using a smart assistant.

This disclosure provides for a system that allows one or more users to initiate voice payment through a smart assistant device and complete the payment transaction using an alternate user payment account associated with the user. Instead of paying through a default wallet associated with the smart assistant device, the system provides convenience to pay using an alternative user payment account/mode. The system selects the user device to which the payment request can be transferred. Alternatively, the system temporarily activates hardware components on the smart assistant device to securely collect card information.

Systems and methods are described herein for transferring a payment transaction to a user device. A payment transaction is initiated for a user, based on a voice command, on a public voice-activated device. A user device associated with the user is identified. A transaction identifier is generated and transmitted to the identified user device. Once the user has entered their banking or credit card information to use for payment, a payment token is received from the user device, either at the smart assistant client device or a payment service provider. The transaction is then completed using the payment token. The payment token may be generated from a local digital wallet on the user device, or from a server-based digital wallet.

In some embodiments, to identify a user device associated with the user, a number of user devices in proximity to the public voice-activated device is determined. If there is only a single user device in proximity to the public voice-activated device, a prompt to authenticate the user is transmitted to the single user device. In response to authenticating the user, the single user device is determined to be associated with the user. If there is more than one device in proximity to the public voice-activated device, a direction, relative to the public voice-activated device, from which the voice command was received is determined. A user device located within a threshold deviation from the direction is identified, and the authentication prompt is transmitted to that user device. In response to authentication of the user on that user device, that user device is determined to be associated with the user.

To determine a direction from which the voice command is received, a plurality of microphones may be employed. Each microphone receives the voice command at a different time. Using the time difference of the arrival of the voice command at each microphone, the direction from which the voice command originated can be determined.

In some embodiments, identifying a user device located within a threshold deviation from the direction may be accomplished by accessing device location data for an area surrounding the public voice-activated device. The location data can be used to determine which of the devices is within a threshold deviation from the direction. If no devices are located within the threshold deviation of the direction, the threshold may be increased. Likewise, if multiple devices are located within the threshold deviation, the threshold may be decreased.

A payment transaction may be split between more than one user. A voice input may be received from each user. A voice profile database is accessed, and each user is identified based on a comparison of the voice input with the voice profile database. An individualized transaction identifier is then sent to the user device associated with each respective user. The individualized transaction identifier for each respective user may include an amount to be paid by the respective user.

BRIEF DESCRIPTION OF THE DRAWINGS

The above and other objects and advantages of the disclosure will be apparent upon consideration of the following detailed description, taken in conjunction with the accompanying drawings, in which.

DETAILED DESCRIPTION

Figure 1:
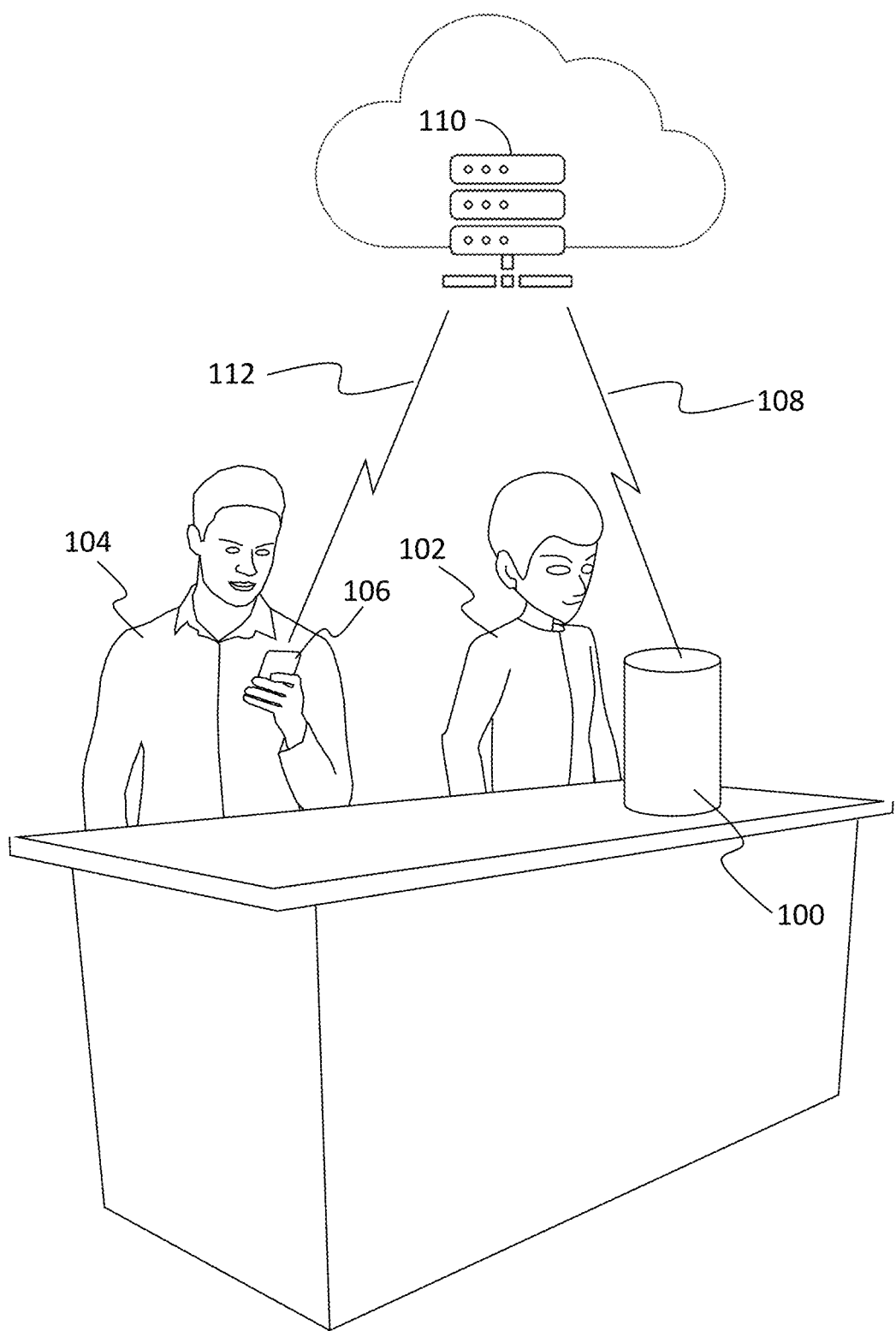
FIG. 1 shows an environment in which a user may complete a transaction initiated on a public voice-activated device using a private user device, in accordance with some embodiments of the disclosure.

In an embodiment, a smart assistant determines a user device to which a payment transaction can be transferred for a user to complete the payment. The system may use a voice-recognition engine (running on a smart assistant device or server or cloud) to recognize a user initiating a voice payment request. Once the user is recognized, the system may identify a registered user device in proximity of the smart assistant device and push transaction details (including transaction ID, merchant's details, etc.) on the registered user device to complete the payment. The registered user device may be linked to the user's voice profile.

Determining the user device to which the transaction should be transferred is important, as the system should send the payment request to the right user device associated with the user who has initiated the request, instead of broadcasting or sending the request to all/any of the user devices present in the vicinity of the smart assistant device.

In an embodiment, the smart assistant may correlate the voice input directional awareness data and the indoor device location data to determine a user device associated with a user who may have initiated the voice-based payment request. The correlation will allow the system to select a user device held by the user who may have initiated the voice-based payment request. If there are multiple users and user devices, in the proximity of the smart assistant device, the voice input directional awareness data and the indoor device location data may help to select a target user device to which payment request should be sent. Any combination of voice directional awareness parameters, such as the direction of the voice (DoV), the direction of arrival (DoA), and speaker localization can be used to estimate the location of the user initiating the payment. As there are multiple microphones present on a smart assistant device, the techniques such as angle of arrival (AoA), time difference of arrival (TDOA), frequency difference of arrival (FDOA), etc., can be used for estimating the direction of arrival. For indoor wireless device location tracking, existing methods can be used to detect the location of different user devices. The user device associated with the user initiating the payment request can be determined.

As used herein, a payment service provider is a third-party company that assists businesses to accept a wide range of online payment methods, such as online banking, credit cards, debit cards, e-wallets, cash cards, and more. In the present disclosure, the payment service provider is broadly used to represent an entity that helps to process the payment on receiving the card/bank details. The activities of the payment service provider include validating the card details and the amount.

Once the target user device is detected, the smart assistant device may generate a transaction ID and transfer the payment transaction to the target user device (e.g., smartphone) to complete the transaction. The smart assistant device can use Wi-Fi direct, Bluetooth, or any other short-range wireless communication to transfer the request to the user device. The smart assistant can also transfer the payment transaction to the user device over a cellular data network. In addition to the notification that gets generated on the user device, the smart assistant can also generate an audio notification for the user that the payment transaction request was sent to the user device. It should be noted that the identity of the user device (e.g., smartphone) is specified in the audio response.

In some embodiments, instead of using the default user profile on the smart assistant device, the system recognizes the user who is making the payment request and allows the requesting user to complete the payment using a trusted user device. The system will enable a user who has their voice profile and user device registered with the smart assistant ecosystem, as well as those users whose voice profile is not registered, to complete the payment.

The user device may generate a payment token (encrypting banking details) against the transaction ID from locally stored banking details upon successfully authenticating the access of locally stored banking details (e.g., Apple Pay® local wallet on the user device). In an embodiment, the payment token can be sent through the smart assistant device to the payment service provider. Alternatively, the payment token can be sent directly from the user's device to the payment service provider. The token may be generated using a public key of the payment service provider or the concerned bank. The respective payment service provider or the bank can only read the banking details (e.g. credit card number, CVV, expiry date, etc.). Neither the smart assistant device nor the merchant is exposed to banking details, only the transaction details (transaction id, transaction value, time, merchant id, etc.) are. The user device may send the transaction status to the smart assistant device, which can update the transaction details (ID, status, etc.) against a purchase request to the merchant.

In some embodiments, the user can also specify the device to which they want to transfer the transaction. For example, the user can issue a voice command to the smart assistant device indicating which device they would like to use to complete the transaction. The user may, for example say, "Hey Alexa, I want to pay on my iPhone" or "Hey Alexa, I will pay from my Samsung tablet." The smart assistant device then identifies the indicated device and transfers the transaction to that device.

On receiving the payment transaction request on a user device, a user may choose to pay through the digital wallet (e.g., Google Pay®, Apple Pay®) that stores card/bank details on the server. Users may authenticate themselves for accessing such digital wallets. Once the user is authenticated, the digital wallet may transfer the encrypted card/bank details along with the transaction ID to the payment service provider. In some cases, digital wallets have also started acting as payment service providers. For simplicity of the explanation in this disclosure, we have considered wallets and payment service providers to be different entities.

In an embodiment, based on the voice authentication of a configured user of a smart assistant device, an input receiving module can be activated. The input receiving module, such as an NFC reader or a camera/optical card reader, if available on the smart assistant device, can be activated for a fixed time. When the fixed time has elapsed, the input receiving module gets deactivated automatically. On receiving a voice-based payment request, the smart assistant device may activate an NFC reader to read the card details from an NFC-enabled card or receive the token containing card details from an NFC-supported client device (e.g., mobile phone wallet). The smart assistant can also provide an option to the user to choose between the available reader, such as an NFC reader, and a camera-based card scanner. In an embodiment, when selected, the camera can be switched on with a localized optical character recognition module to read card information and generate the token. The camera is activated when the payment intent is detected in the voice input. The camera can be switched off soon after recognizing the required numbers (e.g., credit card number, security code, expiration date). The voice command intent-based activation/deactivation of a reader (NFC or camera) will also ensure security/privacy.

The system can also be used for splitting the payment among multiple users based on voice instructions. The user can provide voice instructions to initiate the split payment. The voices of other users in the room are profiled only when the split payment instruction is received from the first user (who is primarily interacting with the smart assistant). The smart assistant can also be configured to proactively detect if there is more than one user in the room. If the assistant detects the presence of multiple users in a room, the smart assistant can ask the user who initiated the payment request if they want to split the payment. Until this step, the system will just detect that there are a number of users in the room based on different audio/video clues. The smart assistant may temporally initiate a voice recognition module and wait for a configured time duration (e.g., 10 seconds) to receive input from different users. All the voice inputs from different users can be analyzed to detect the profiles of different users and their intent to do the split payment. The identity and intent of each user are determined based on the voice inputs received within the configured time duration. Based on the determination of participating users, the system can send a payment request to each of the participating users, registered users. The respective users may show their intent to share the expense by saying "me," "me too," "charge me," etc. Each respective user device can be a registered user device or one as determined using the correlation of speaker location.

The system also tries to understand who wants to make the payment. In absence of direct response, the system may use natural language processing (NLP) to detect affirmative voice responses from two or more participants toward the specific intent (bill payment) and split the bill to be shared with the selected members. Voice tone and content can be analyzed to determine actual intent and willingness to contribute. It may happen that more people initially showed interest to share the expense, but one of the users may just be saying so without actual intent of contributing. The system may score enthusiasm in voice input and determine the intent to contribute accordingly. The system may analyze the input voice of all the users, detect user profiles, and present payment requests to respective user devices, through a smart assistant to process the payment.

In an embodiment, a camera attached to the smart assistant device can also be initiated for a configured duration (e.g., 10 seconds), and the camera feed can be analyzed to detect the profile of different users and their intent to split the payment. Based on hand gestures (e.g., hands up) system can determine the intent of participating users.

To protect the privacy of non-participating users in the room, the voice profiling module or gesture recognition module can detect a number of participating users and attempt to recognize only those participating users. The user payment intent recognition (to participate in split payment) step will precede the identity recognition step. The identity of only participating users is determined. This sequence will improve the efficiency of the identify recognition module as well as obviate the privacy concerns of non-participating users.

In an embodiment, the system can activate the camera/NFC reader for a specific time, and wait for two or more users to scan their card details. The payment can be split equally and charged to different cards scanned within the specified time. The smart assistant device generates a separate token for each scanned card and sends the tokens to the payment service provider.

FIG. 1 shows an environment in which a user may complete a transaction initiated on a public voice-activated device using a private user device, in accordance with some embodiments of the disclosure. Public voice-activated device 100 may be a smart assistant device (e.g., Amazon Echo®, Google Home®) and may be located in an area where more than one person is likely to be present. For example, public voice-activated device 100 may be located in a public space in a user's house. Users 102 and 104 may be present when user 104 issues a voice command to purchase an item through public voice-activated device 100. Public voice-activated device 100 identifies user device 106 as being associated with user 104. For example, public voice-activated device 100 may compare voice characteristics of the voice command to a locally or remotely stored database of voice profiles to identify user 104. Public voice-activated device 100 then identifies a user device associated with the identified user (i.e., user 104).

Public voice-activated device 100 communicates, via transmission path 108, with server 110. Public voice-activated device 100 transmits details of the requested transaction to server 110. Identifiers of the user and the user device associated with the user may also be transmitted to server 110. Server 110 then transmits, via communication path 112, a transaction identifier to user device 106. User 104 authenticates themselves on user device 106 and enters or selects payment information. For example, the user may manually enter a credit card number, or may select a stored payment method from a local digital wallet or cloud-based digital wallet. User device 106 transmits, via transmission path 112, an encrypted payment token to server 110. Server 110 completes the transaction using the payment token. For example, the payment token may be transmitted to the merchant's payment service provider, where it is decrypted, and the payment details contained therein are used to complete the transaction. A confirmation of completion may be transmitted to either user device 106, public voice-activated device 100, or both.

Figure 2:
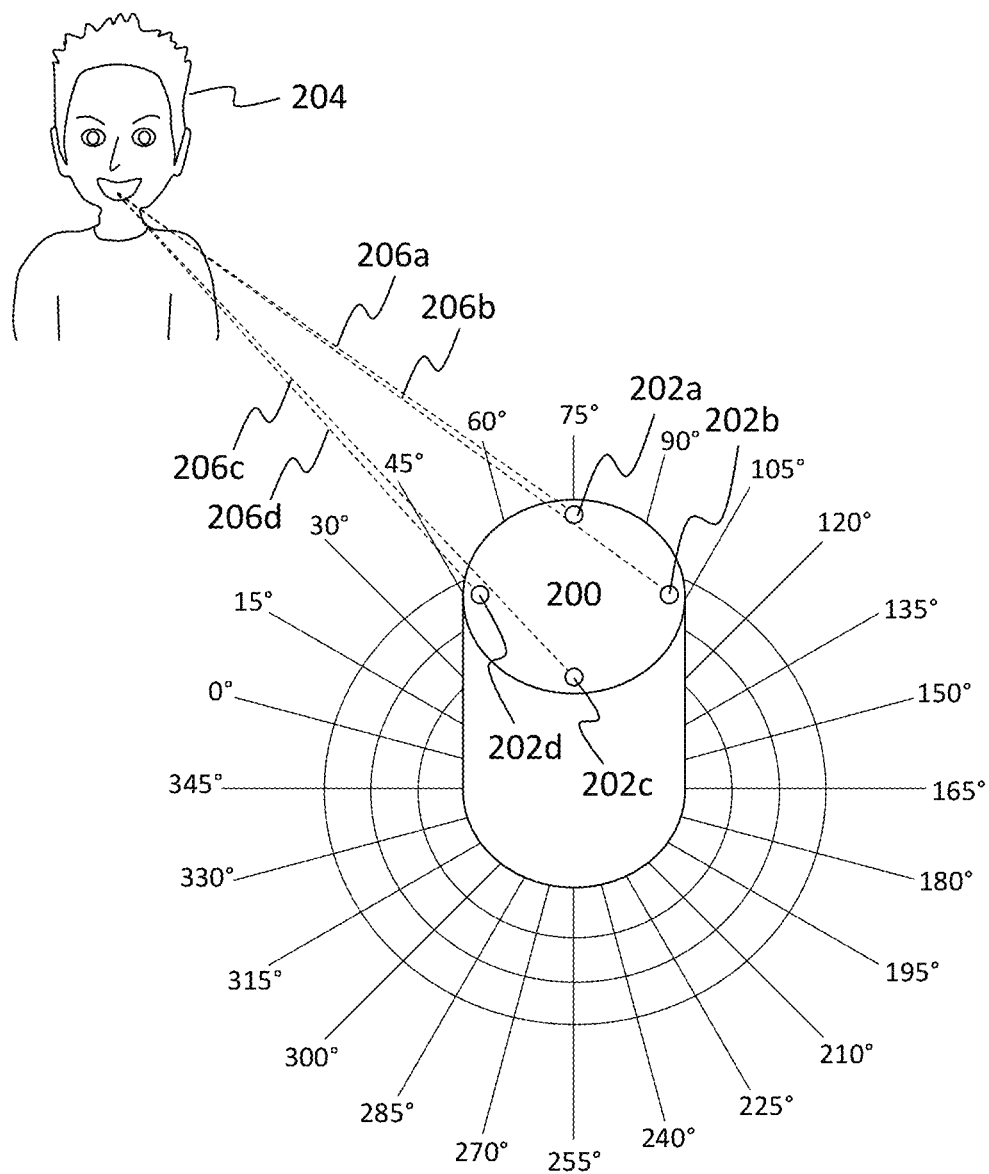
FIG. 2 shows an example of identifying a direction from which a voice command was received, in accordance with some embodiments of the disclosure.

FIG. 2 shows an example of identifying a direction from which a voice command was received, in accordance with some embodiments of the disclosure. Public voice-activated device 200 may comprise a plurality of microphones 202a, 202b, 202c, and 202d. Public voice-activated device 200 may identify directions based on a 360-degree field around the public voice-activated device 200. Public voice activated device 200 may set a reference direction as zero degrees. User 204 may issue a voice command to public voice-activated device 200. The sound of the voice of user 204 will have a different distance to travel to each of microphones 202a-d. Public voice-activated device 200 determines a time difference between the arrival of the sound at each microphone. For example, the sound may travel distance 206a to reach microphone 202a first. Public voice-activated device 200 may therefore make a preliminary determination of a quadrant from which the sound arrived (e.g., between 0 and 90 degrees) and set the time at which the sound arrived at microphone 202a as $T_0$. As the sound travels distances 206b-d, arriving at microphones 202b-d, respectively, the time difference between each arrival and $T_0$ is calculated. The differences in arrival time at each microphone can then be used to refine the determination of direction from a quadrant to a narrow sector (e.g., between 30 and 40 degrees).

In some embodiments, each of microphones 202a-d may be an array of unidirectional microphones, each unidirectional microphone facing a different direction. When the sound arrives at the array of microphones, the relative volume of sound detected by each unidirectional microphone can be used to determine a direction, relative to the array of microphones, from which the sound arrived.

Figure 3:
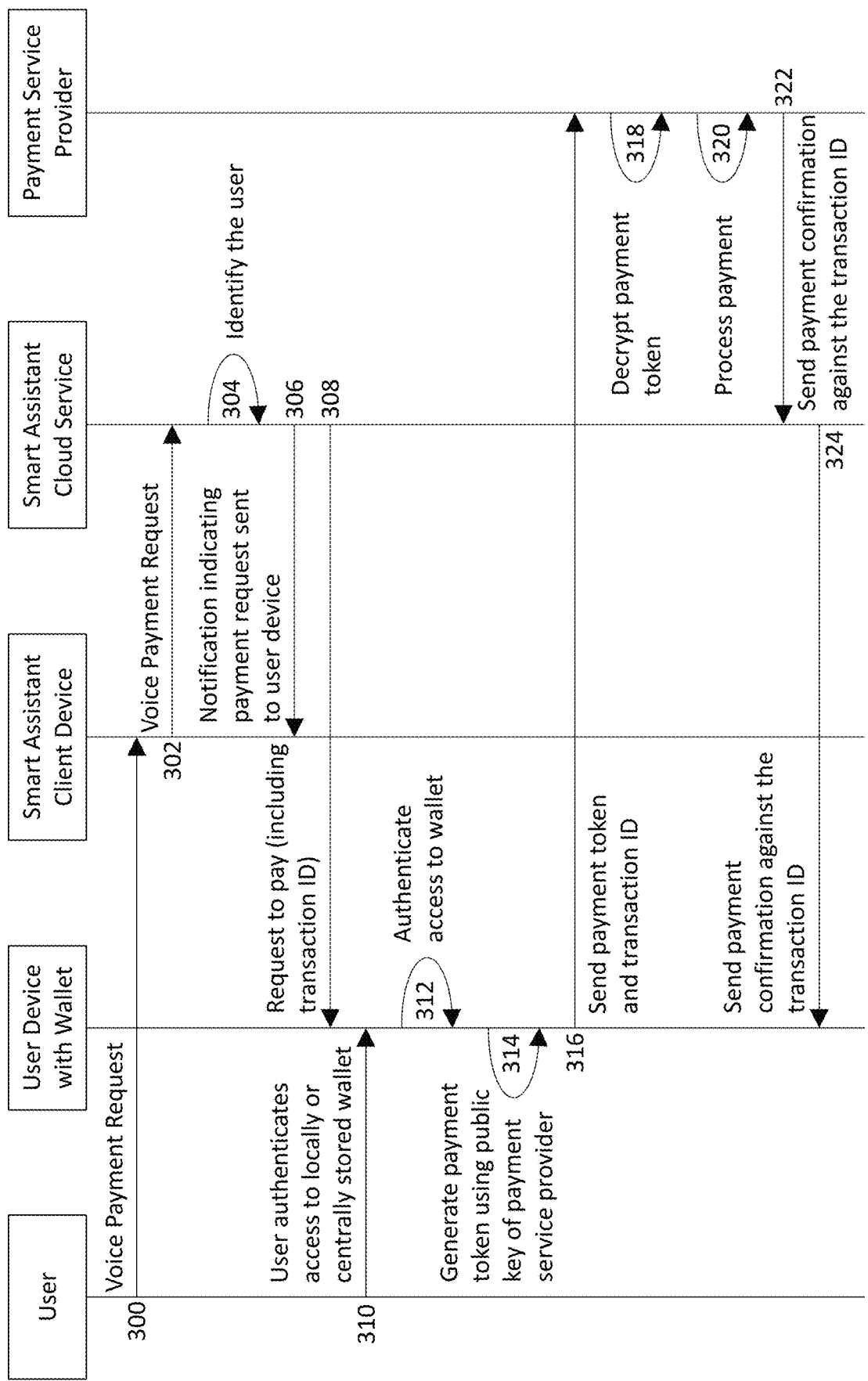
FIG. 3 is a diagram representing the sequence of events for initiating a payment transaction on a public voice-activated device and transferring the transaction to a private user device for completion, in accordance with some embodiments of the disclosure.

FIG. 3 is a diagram representing the sequence of events for initiating a payment transaction on a public voice-activated device and transferring the transaction to a private user device for completion, in accordance with some embodiments of the disclosure. At 300, a user makes a voice payment request. For example, the user may say a wake word for the public-voice-activated device (e.g., "Alexa" or "Hey Google") and then ask to purchase a product or media asset. At 302, the smart assistant client device forwards the voice payment request to a smart assistant cloud service. For example, transcription of voice commands may be handled by the cloud service, rather than locally by the smart assistant client device. At 304, the smart assistant cloud service identifies the user. For example, the smart assistant cloud service may compare voice characteristics of the voice payment request to a database of voice profiles. If a match is found, the user is identified as the user associated with the matching voice profile. The smart assistant cloud service may also identify a user device associated with the user who is in proximity to the smart assistant client device. This may be accomplished by accessing device location data for an area surrounding the smart assistant client device, or by requesting location data from known devices associated with the user. In some embodiments, the smart assistant cloud service may perform sound localization using input received at different microphones of the smart assistant client device. The sound location can be correlated with device locations to identify a user device.

At 306, the smart assistant cloud service transmits a notification to the smart assistant client device indicating that the payment request was sent to the identified user device. At 308, the smart assistant cloud service transmits the request to pay to the user device. The request to pay includes a transaction ID, and may also include other transaction details, such as the amount to be paid, merchant information, and/or product information.

At 310, the user authenticates access to a locally or centrally (i.e., remotely) stored digital wallet. For example, the user may enter a password or PIN, or may use biometric factors to authenticate access to the user device as a whole, or specifically to a digital wallet application or service. At 312, the user device authenticates access to the digital wallet application and, at 314, generates a payment token using a public encryption key of a payment service provider that will be used to complete the transaction (e.g., Amazon Pay®, PayPal®, Square®). The payment token contains payment details such as a credit card information or bank account information.

At 316, the user device transmits the payment token to the payment service provider to initiate payment. In some embodiments, the user device transmits the payment token to the smart assistant client device, which in turn forwards the payment token to the payment service provider. The token may be transmitted from the user device to the smart assistant client device using Wi-Fi, Bluetooth, Bluetooth low energy, NFC, or any other suitable communication format or protocol. At 318, the payment service provider decrypts the payment token. At 320, using the information contained in the payment token, the payment service provider processes the payment. Once the payment is complete, the payment service provider transmits, at 322, a payment confirmation against the transaction ID to the smart assistant cloud service. The smart assistant cloud service then, at 324, transmits the confirmation to the user device, thereby informing the user that the payment was successfully processed.

Figure 4:
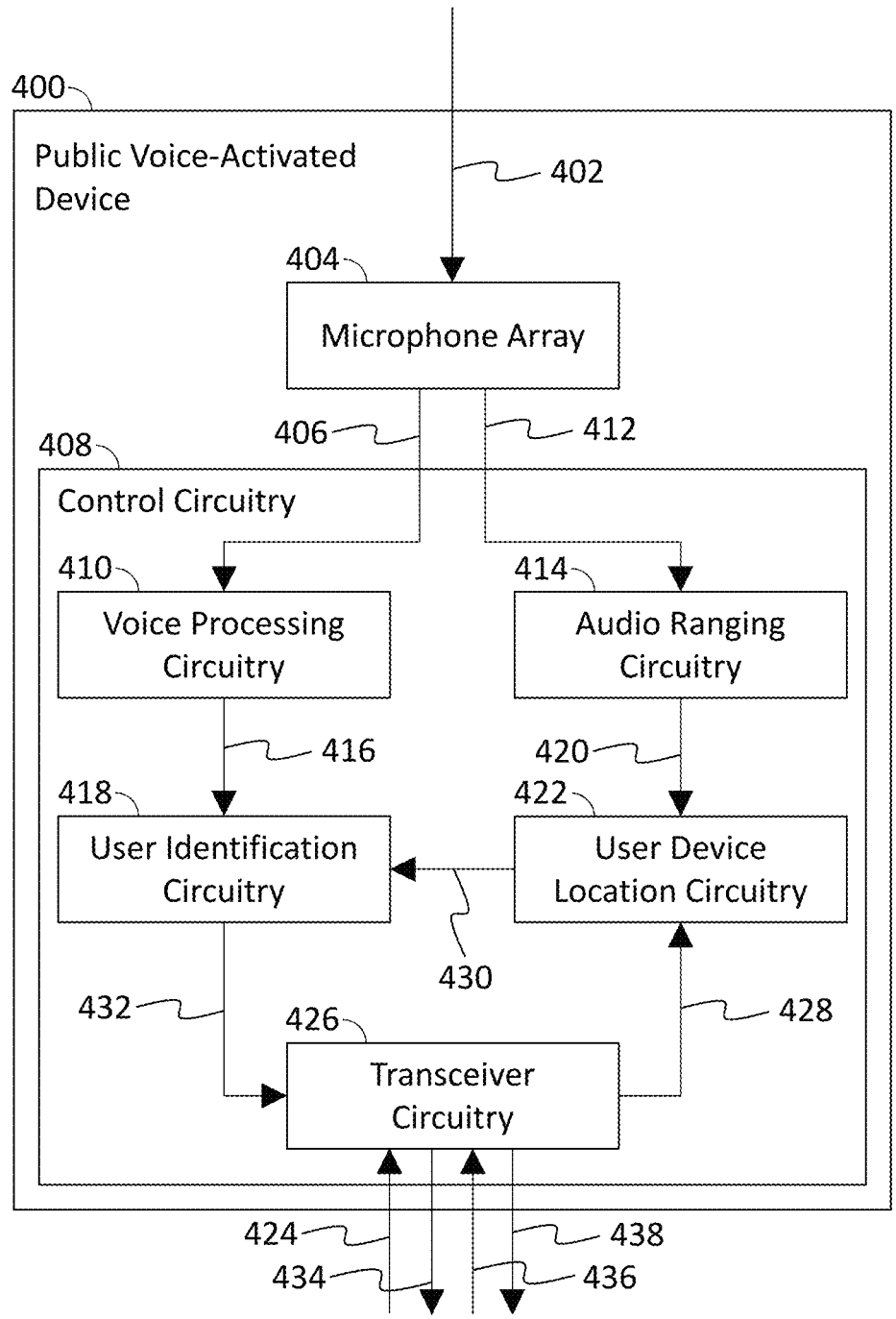
FIG. 4 is a block diagram representing components and dataflow therebetween of a public voice-activated device, in accordance with some embodiments of the disclosure.

FIG. 4 is a block diagram representing components and dataflow therebetween of a public voice-activated device, in accordance with some embodiments of the disclosure. Public voice-activated device 400 receives 402 voice inputs from a user. The voice input may be a command to initiate a transaction, such as purchase of a product or media asset. The voice inputs are received using microphone array 404. Microphone array 404 may comprise two or more microphones disposed at different positions on or near the surface of public voice-activated device 400. Sound waves corresponding to the voice input may thus reach each individual microphone of microphone array 404 at different times.

Microphone array 404 transmits 406 the voice input to control circuitry 408, where it is received using voice processing circuitry 410. Control circuitry 408 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Voice processing circuitry 410 analyzes voice characteristics of the voice input to identify the user. For example, voice processing circuitry 410 determines the mean frequency of the voice, as well as tone, timbre, cadence, and other voice characteristics. Voice processing circuitry 410 may generate a voice signature based on the voice characteristics.

Microphone array 404 also transmits 412, to control circuitry 408, data describing the arrival of sound corresponding to the voice input at each microphone of microphone array 404. This data is received using audio ranging circuitry 414. Audio ranging circuitry 414 calculates a time difference between the earliest arrival of the sound at any microphone of microphone array 404 and the arrival times of the sound at each of the other microphones of microphone array 404. Audio ranging circuitry 414 determines, based on the time differences, a direction from which the sound originated. For example, a coarse direction can be determined from the position of the microphone at which the sound arrived first relative to the other microphones in a microphone array 404. That is, the microphone at which the sound arrived first is closest to the sound source. If there are a total of four microphones in microphone array 404, the sound source can be coarsely localized to a quadrant defined by lines extending from the microphone at which the sound arrived first at 45-degree angles to either side of the microphone. If the sound arrives at two microphones simultaneously, the sound source can be localized to an area that is equidistant from each of the two microphones. In some embodiments, the sound arrival data may include data describing the angle of arrival of the sound relative to each microphone. These angle data can be used to finely localize the source of the sound.

Voice processing circuitry 410 transmits 416 the voice characteristics or voice signature to user identification circuitry 418. User identification circuitry 418 compares the voice characteristics or the voice signature to a voice profile database. The voice profile database may be stored locally on public voice-activated device 400 (e.g., within a memory of public voice-activated device 400 or within user identification circuitry 418 itself) or may be stored on a server associated with public voice-activated device 400 (e.g., smart assistant cloud service of FIG. 3).

Audio ranging circuitry 414 also transmits 420 the sound localization information to user device location circuitry 422. User device location circuitry 422 uses the sound localization information as a baseline for identifying a user device associated with the user who entered the voice input. For example, since the user may be in possession of a smartphone or may have placed a suitable user device on a surface near them, user device location circuitry 422 may search for user devices located in the same direction as the source of the sound. Control circuitry 408 may receive 424 device location information for the area surrounding public voice-activated device 400 using transceiver circuitry 426. Transceiver circuitry 426 comprises a network connection over which data can be transmitted to and received from remote devices, such as an ethernet connection, Wi-Fi connection, mobile broadband interface, or connection employing any other suitable networking protocol. Transceiver circuitry 426 transmits 428 the device location data to user device location circuitry 422, which uses the information to identify user devices within a threshold deviation from the direction from which the sound was received. For example, devices within a five-degree deviation from the direction may be considered as candidate user devices. If no user devices are located within the threshold deviation from the direction, the threshold may be increased. If multiple user devices are located within the threshold deviation from the direction, the threshold may be decreased.

Once a user device has been identified, user device location circuitry transmits 430 an identifier of the user device to user identification circuitry 418. User identification circuitry 418 generates an instruction to authenticate the identified user on the identified user device and transmits 432 the instruction to transceiver circuitry 426. Control circuitry 408 may generate a transaction ID for the requested transaction. Transceiver circuitry 426 then transmits 434 the instruction to authenticate the identified user to the identified user device, along with the transaction ID.

After authenticating to the identified user device, the user selects a payment method with which to complete the transaction. In some embodiments, control circuitry 408 may instruct the activation of an NFC card reader, camera, or other sensor capable of capturing payment details from the user. An encrypted payment token comprising the payment details is then transmitted from the user device to a payment service provider. Public voice-activated device 400 receives 436, from the payment service provider, using transceiver circuitry 426, a notification that payment was completed. Transceiver circuitry 426 then transmits 438 the notification to the user device. In some embodiments, the notification is transmitted from the payment service provider directly to the user device.

In some embodiments, multiple users issue voice commands to split a transaction between them. The above processes are duplicated for each user. The transaction identifier may be customized for each user, such as by including different amounts owed by each user. Control circuitry 408 may collect the payment tokens from each user device and wait until all users have provided a payment token before completing the transaction.

Figure 5:
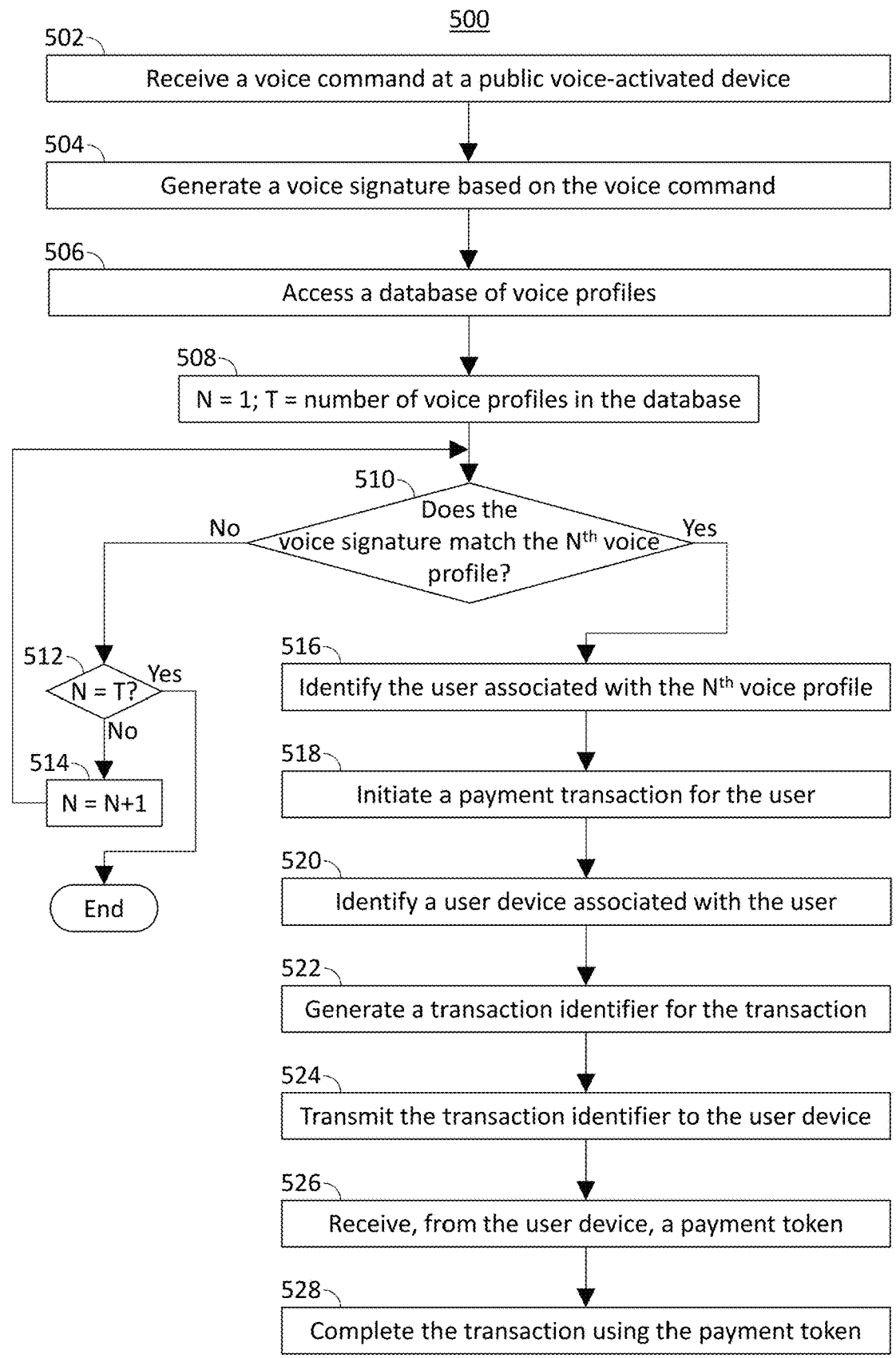
FIG. 5 is a flowchart representing an illustrative process for completing a transaction initiated on a public voice-activated device using a private user device, in accordance with some embodiments of the disclosure.

FIG. 5 is a flowchart representing an illustrative process 500 for completing a transaction initiated on a public voice-activated device using a private user device, in accordance with some embodiments of the disclosure. Process 500 may be implemented on control circuitry 408. In addition, one or more actions of process 500 may be incorporated into or combined with one or more actions of any other process or embodiment described herein.

At 502, control circuitry 408 receives a voice command. Audio data may be received using a microphone or array of microphones. At 504, control circuitry 408 generates a voice signature based on the voice command. Control circuitry 408 analyzes voice characteristics of the voice command, such as mean frequency, tone, timbre, cadence, rhythm, and accent. The voice characteristics are then used to generate a voice signature of the voice command.

At 506, control circuitry 408 accesses a database of voice profiles. Each voice profile may include a voice signature against which the voice signature of the voice command can be compared. At 508, control circuitry 408 initializes a counter variable N, setting its value to one, and a variable T representing the number of voice profiles in the database. At 510, control circuitry 408 determines whether the voice signature matches the $N^{th}$ voice profile. If the voice signature does not match the $N^{th}$ voice profile ("No" at 510), then, at 512, control circuitry 408 determines whether N is equal to T, meaning that the voice signature has been compared with all voice profiles in the database. If N is not equal to T ("No" at 512), then, at 514, control circuitry 408 increments the value of N by one and processing returns to 510.

If the voice signature does match the $N^{th}$ voice profile ("Yes" at 510), then, at 516, control circuitry 408 identifies the user associated with the $N^{th}$ voice profile. For example, the voice profile may include a user identifier for the user to whom the voice signature stored in the voice profile belongs. At 518, control circuitry 408 initiates a payment transaction for the user and, at 520, identifies a user device associated with the user.

At 522, control circuitry 408 generates a transaction identifier for the transaction. The transaction identifier may include the user identifier, the amount of the transaction, and merchant details. At 524, control circuitry 408 transmits the transaction identifier to the user device. At 526, control circuitry 408 receives, from the user device, a payment token. The payment token may be encrypted and may contain payment details such as a credit card number or banking information. In some embodiments, an NFC card reader, camera, or other sensor may be activated by control circuitry 408 for a set period of time, during which payment information can be captured from the user. The payment token is then generated from the captured information. At 528, control circuitry 408 completes the transaction using the payment token. For example, the payment token is transmitted to a payment service provider. The payment service provider decrypts the payment token and charges the user's account(s) accordingly.

If N is equal to T ("Yes" at 512), then, the process ends without having identified a user from the voice command and the process ends. In some embodiments, control circuitry 408 may notify the user that they could not be identified and request additional identification information. Alternatively, control circuitry 408 may prompt the user to establish a voice profile.

The actions or descriptions of FIG. 5 may be used with any other embodiment of this disclosure. In addition, the actions and descriptions described in relation to FIG. 5 may be done in suitable alternative orders or in parallel to further the purposes of this disclosure.

Figure 6:
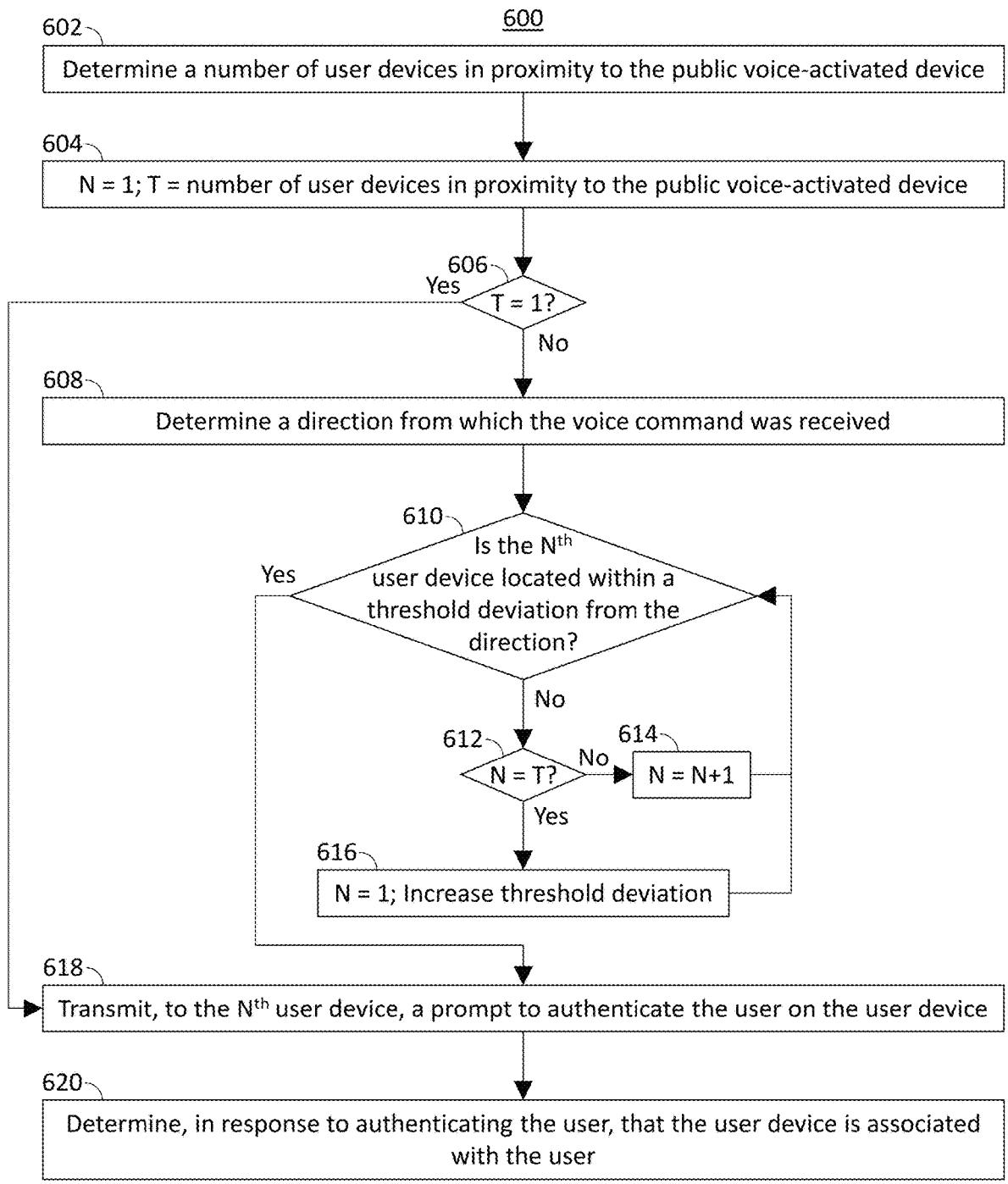
FIG. 6 is a flowchart representing an illustrative process for identifying a user device to which to transfer the transaction, in accordance with some embodiments of the disclosure.

FIG. 6 is a flowchart representing an illustrative process 600 for identifying a user device to which to transfer the transaction, in accordance with some embodiments of the disclosure. Process 600 may be implemented on control circuitry 408. In addition, one or more actions of process 600 may be incorporated into or combined with one or more actions of any other process or embodiment described herein.

At 602, control circuitry 408 determines a number of user devices in proximity to the public voice-activated device. For example, control circuitry 408 may access device location data to determine the location of user devices in the area surrounding the public voice-activated device. Control circuitry 408 may use other device discovery methods, such as those provided by Bluetooth, to directly connect with, and enumerate, user devices in proximity to the public voice-activated device.

At 604, control circuitry 408 initializes a counter variable N, setting its value to one, and a variable T representing the number of user devices in proximity to the public voice-activated device. At 606, control circuitry determines whether the total number of devices T is equal to one, meaning that there is only one user device in proximity to the public voice-activated device. If there is more than one user device ("No" at 606), then, at 608, control circuitry 408 determines a direction from which the voice command was received. This may be accomplished using directional information from microphone array 404 as described above in connection with FIG. 2.

At 610, control circuitry 408 determines whether the $N^{th}$ user device is located within a threshold deviation from the direction. For example, if the direction is determined to be 90 degrees from a reference direction, control circuitry 408 may determine whether the $N^{th}$ user device is located within five degrees of the direction, i.e., between 85 degrees and 95 degrees from the reference direction. If the $N^{th}$ user device is not located within the threshold deviation from the direction ("No" at 610), then, at 612, control circuitry 408 determines whether N is equal to T, meaning that the location of every user device has been checked. If N is not equal to T ("No" at 612), then, at 614, control circuitry increments the value of N by one and processing returns to 610. If N is equal to T ("Yes" at 612), then no user devices were located within the threshold deviation from the direction and, at 616, control circuitry 408 resets the value of N to one and increases the threshold deviation. Processing then return to 610.

If the $N^{th}$ user device is located within the threshold deviation from the direction ("Yes" at 610) or if there is only one user device in proximity to the public voice-activated device ("Yes" at 606), at 618, control circuitry 408 transmits, to the $N^{th}$ user device, a prompt to authenticate the user on the device. For example, the prompt may require the user to enter a password, PIN, or biometric parameter to authenticate to the device. At 620, control circuitry 408 determines, in response to authenticating the user, that the user device is associated with the user.

The actions or descriptions of FIG. 6 may be used with any other embodiment of this disclosure. In addition, the actions and descriptions described in relation to FIG. 6 may be done in suitable alternative orders or in parallel to further the purposes of this disclosure.

Figure 7:
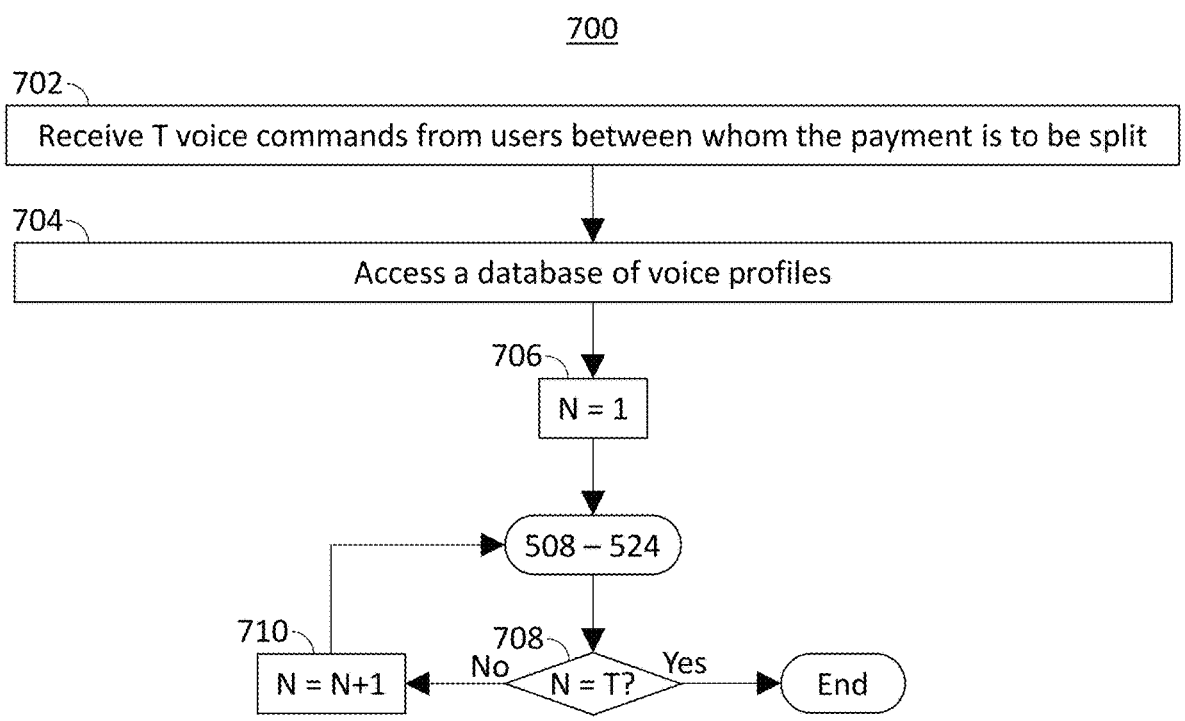
FIG. 7 is a flowchart representing an illustrative process for splitting a payment between multiple users, in accordance with some embodiments of the disclosure.

FIG. 7 is a flowchart representing an illustrative process 700 for splitting a payment between multiple users, in accordance with some embodiments of the disclosure. Process 700 may be implemented on control circuitry 408. In addition, one or more actions of process 700 may be incorporated into or combined with one or more actions of any other process or embodiment described herein.

At 702, control circuitry 408 receives a number of voice commands T from users between whom the payment is to be split. At 704, control circuitry 408 accesses a database of voice profiles. At 706, control circuitry 408 initializes a counter variable, setting its value to one. Then, for the $N^{th}$ voice command, control circuitry 408 performs the actions described at 508 through 524 of FIG. 5, identifying the $N^{th}$ user based on the voice command, initiating a payment transaction for the $N^{th}$ user, identifying a user device associated with the $N^{th}$ user, generating a transaction identifier for the $N^{th}$ user's transaction, transmitting the transaction identifier to the user device associated with the $N^{th}$ user, receiving a payment token, and completing the $N^{th}$ user's transaction using the payment token.

At 708, control circuitry 408 determines whether N is equal to T, meaning that all voice commands have been processed. If N is not equal to T ("No" at 708), then, at 710, control circuitry 408 increments the value of N by one and the actions described at 508 through 524 of FIG. 5 are performed for the next voice command. If N is equal to T ("Yes" at 708), then the process ends.

The actions or descriptions of FIG. 7 may be used with any other embodiment of this disclosure. In addition, the actions and descriptions described in relation to FIG. 7 may be done in suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method performed by a public voice-activated device, the method comprising:
receiving a voice command to initiate a transaction;
initiating, based on the voice command received by the public voice-activated device, the transaction for a first user amongst a plurality of users proximate to the public voice-activated device, wherein each user of the plurality of users is respectively associated with a respective user device of a plurality of user devices;
determining a plurality of locations of the plurality of user devices, respectively, proximate to the public voice-activated device, based on wireless signals transmitted between the plurality of user devices and the public voice-activated device;
determining that the first user, associated with a first user device of the plurality of user devices, uttered the voice command by:
based at least in part on determining that the plurality of user devices is proximate to the public voice-activated device, determining a direction, relative to a reference direction with respect to the public voice-activated device, from which the voice command was received;
based at least in part on the direction relative to the reference direction, determining a first threshold deviation from the direction;
determining, based at least in part on the plurality of locations of the plurality of user devices, that each of a first location of the first user device of the plurality of user devices, and a second location of a second user device of the plurality of user devices, is within the first threshold deviation from the direction, wherein the second user device is associated with a second user of the plurality of users;
based at least in part on the determining that each of the first location of the first user device and the second location of the second user device is within the first threshold deviation from the direction, modifying the first threshold deviation to obtain a second threshold deviation that is less than the first threshold deviation; and
identifying, as a device of the plurality of user devices that is associated with a user of the plurality of users that uttered the voice command, the first user device associated with the first user based at least in part on determining that the first location of the first user device is within the second threshold deviation from the direction and that the second location of the second user device is not within the second threshold deviation from the direction and therefore that the second user did not utter the voice command;
generating an identifier for the transaction;
transmitting the identifier for the transaction to the identified first user device;
receiving, from the identified first user device, an encrypted digital token comprising payment details for performing the transaction, wherein the first user device generates the encrypted digital token based at least in part on a digital wallet stored locally on the first user device and an encryption key related to a service provider associated with the transaction, and wherein the encrypted digital token is generated based at least in part on authenticating the first user of the first user device based on input received at the first user device; and
causing performance of the transaction based at least in part by transmitting the encrypted digital token to the service provider associated with the transaction, wherein the service provider decrypts the encrypted digital token to complete the transaction using the payment details.

2. The method of claim 1, wherein determining the first location from which the voice command was received further comprises:
receiving the voice command using a first microphone and a second microphone of the public voice-activated device;
determining a time difference between receiving the voice command using the first microphone and receiving the voice command using the second microphone; and
determining, based at least in part on the time difference, the direction from which the voice command was received.

3. The method of claim 1, wherein the voice command is a first voice command, the identifier for the transaction is a first identifier, and the transaction is to be performed in relation to the first user and the second user, the method further comprising:
receiving a second voice command by the public voice-activated device;
accessing a voice profile database; and
identifying, based on the voice profile database, the first user associated with the first voice command received by the public voice-activated device and the second user associated with the second voice command received by the public voice-activated device;
wherein transmitting the identifier for the transaction to the first user device further comprises transmitting, to the first user device of the first user and the second user device of the second user, respective individualized identifiers for the transaction.

4. The method of claim 3, wherein the individualized transaction identifier for the first user indicates a portion of the transaction related to the first user and the individualized transaction identifier for the second user includes a portion of the transaction related to the second user.

5. A system comprising:
a public voice-activated device comprising:
control circuitry configured to:
receive a voice command to initiate a transaction;
initiate, based on the voice command received by the public voice-activated device, the transaction for a first user amongst a plurality of users proximate to the public voice-activated device, wherein each user of the plurality of users is respectively associated with a respective user device of a plurality of user devices;
determine a plurality of locations of the plurality of user devices, respectively, proximate to the public voice-activated device, based on wireless signals transmitted between the plurality of user devices and the public voice-activated device;
determine that the first user, associated with a first user device of the plurality of user devices, uttered the voice command by:
based at least in part on determining that the plurality of user devices is proximate to the public voice-activated device, determine a direction, relative to a reference direction with respect to the public voice-activated device, from which the voice command was received;

based at least in part on the direction relative to the reference direction, determine a first threshold deviation from the direction;

determine, based at least in part on the plurality of locations of the plurality of user devices, that each of a first location of the first user device of the plurality of user devices, and a second location of a second user device of the plurality of user devices, is within the first threshold deviation from the direction, wherein the second user device is associated with a second user of the plurality of users;

based at least in part on the determining that each of the first location of the first user device and the second location of the second user device is within the first threshold deviation from the direction, modify the first threshold deviation to obtain a second threshold deviation that is less than the first threshold deviation; and identify, as a device of the plurality of user devices that is associated with a user of the plurality of users that uttered the voice command, the first user device associated with the first user based at least in part on determining that the first location of the first user device is within the second threshold deviation from the direction and that the second location of the second user device is not within the second threshold deviation from the direction and therefore that the second user did not utter the voice command;

generate an identifier for the transaction;

transmit the identifier for the transaction to the identified first user device;

receive, from the identified first user device, an encrypted digital token, wherein the first user device generates the encrypted digital token based at least in part on a digital wallet stored locally on the first user device and an encryption key related to a service provider associated with the transaction, and wherein the encrypted digital token is generated based at least in part on authenticating the first user of the first user device based on input received at the first user device; and cause performance of the transaction based at least in part on transmitting the encrypted digital token to the service provider associated with the transaction, wherein the service provider decrypts the encrypted digital token to complete the transaction using payment details.

6. The system of claim 5, wherein the control circuitry configured to determine the first location from which the voice command was received is further configured to:

receive the voice command using a first microphone and a second microphone of the public voice-activated device;

determine a time difference between receiving the voice command using the first microphone and receiving the voice command using the second microphone; and determine, based at least in part on the time difference, the direction from which the voice command was received.

7. The system of claim 5, wherein the voice command is a first voice command, the identifier for the transaction is a first identifier, and the transaction is to be performed in relation to the first user and the second user, and wherein the control circuitry is further configured to:

receive a second voice command by the public voice-activated device;

access a voice profile database;

identify, based on the voice profile database, the first user associated with the first voice command received by the public voice-activated device and the second user associated with the second voice command received by the public voice-activated device; and transmit the identifier for the transaction to the first user device by transmitting, to the first user device of the first user and the second user device of the second user, respective individualized identifiers for the transaction.

8. The system of claim 7, wherein the individualized transaction identifier for the first user indicates a portion of the transaction related to the first user and the individualized transaction identifier for the second user includes a portion of the transaction related to the second user.

9. The method of claim 1, wherein the payment details comprise bank account information or credit card information.

10. The method of claim 1, wherein the first threshold deviation is five degrees.

11. The method of claim 1, wherein the plurality of user devices correspond to a plurality of smartphones.

12. The method of claim 1, further comprising:

receiving, at the public voice-activated device, a confirmation that the transaction was completed.

13. The method of claim 1, wherein the wireless signals transmitted between the plurality of user devices and the public voice-activated device, used to determine the plurality of locations of the plurality of user devices, is transmitted via Bluetooth.

14. The method of claim 1, wherein the encrypted digital token is received from the first user device via Bluetooth, Bluetooth low energy, Wi-Fi, or near-field communication (NFC).

15. The system of claim 5, wherein the payment details comprise bank account information or credit card information.

16. The system of claim 5, wherein the first threshold deviation is five degrees.

17. The system of claim 5, wherein the plurality of user devices correspond to a plurality of smartphones.

18. The system of claim 5 wherein the control circuitry is further configured to:

receive, at the public voice-activated device, a confirmation that the transaction was completed.

19. The system of claim 5, wherein the wireless signals transmitted between the plurality of user devices and the public voice-activated device, used to determine the plurality of locations of the plurality of user devices, is transmitted via Bluetooth.

20. The system of claim 5, wherein the encrypted digital token is received from the first user device via Bluetooth, Bluetooth low energy, Wi-Fi, or near-field communication (NFC).

* * * * *